United States Patent

[11] 3,619,268

[72] Inventors Earl J. Robertson
 Grosse Ile;
 Robert M. Rodak, Wyandotte, both of Mich.
[21] Appl. No. 801,738
[22] Filed Feb. 24, 1969
[45] Patented Nov. 9, 1971
[73] Assignee BASF Wyandotte Corporation
 Wyandotte, Mich.

[54] LAMINATED ARTICLES COMPRISING A THERMOPLASTIC CORE AND A HIGH DENSITY RIGID POLYURETHANE FOAM COATING
7 Claims, No Drawings

[52] U.S. Cl.................................................. 117/104 R,
 117/161 KP, 117/138.8 A, 260/2.5 AQ, 260/77.5 AQ
[51] Int. Cl....................................................... B44d 1/22
[50] Field of Search........................................ 117/161 KP, 138.8, 104 R; 260/77.5 AQ, 2.5 AQ

[56] References Cited
UNITED STATES PATENTS

| | | | |
|---|---|---|---|
| 3,054,755 | 9/1962 | Windemuth et al. | 260/77.5 X |
| 3,067,148 | 12/1962 | Sandridge et al. | 260/77.5 X |
| 3,094,434 | 6/1963 | Chapman et al. | 260/77.5 X |
| 3,147,137 | 9/1964 | Glass et al. | 117/161 X |
| 3,164,568 | 1/1965 | Nordt et al. | 117/161 X |

Primary Examiner—Ralph S. Kendall
Attorneys—Joseph D. Michaels, Cedric H. Kuhn, Robert E. Dunn, Charles G. Lamb and Bernhard R. Swick ABSTRACT: High density rigid polyurethane foams are employed as coatings for thermoplastic polymers. The resulting laminated articles are useful insulative articles such as beverage coolers, building articles such as building panels and buoyant articles such as sailboats.

LAMINATED ARTICLES COMPRISING A THERMOPLASTIC CORE AND A HIGH DENSITY RIGID POLYURETHANE FOAM COATING

The present invention relates to laminated articles comprising a thermoplastic core and a high density rigid polyurethane foam coating and to a method of preparing such articles. More particularly, the invention relates to composite articles having a thermoplastic core and a hard thermoset rigid polyurethane foam coating directly adherent thereto.

It is well known in the art that thermoplastic polymers are useful in the manufacture of articles such as beverage coolers, building panels, sailboats, surfboards, and buoys. Foams of styrene polymers are particularly useful for such articles since they possess low densities and excellent insulative properties.

A major disadvantage of thermoplastic polymers is the fact that these polymers do not possess tough hard outer skins. This is particularly a problem if the thermoplastic polymer is employed in the preparation of articles such as boats and building panels which are often subjected to harsh treatment. In an attempt to overcome this problem, various types of hard coatings for thermoplastic polymers have been proposed by the art. Two of the most widely proposed coatings are epoxy resins and polyester resins. However, both of these resins possess certain undesirable characteristics. Epoxy resins provide coatings which are relatively unstable and develop color. Polyester resins require excess heat to promote cure and thus severely degrade the thermoplastic core and, in addition, because of their poor adhesion to thermoplastic polymers, require the use of an adhesive to bond the coating to the thermoplastic.

It is an object of the present invention to provide a new type of hard coating for thermoplastic polymers. A further object of the present invention is to provide a hard polyurethane foam coating for thermoplastic polymers. Still another object of the present invention is to provide a laminated article comprising a thermoplastic core and a high density rigid polyurethane foam coating. Another object of the present invention is to prepare a laminated article having a thermoplastic core and a high density polyurethane foam coating directly adherent thereto. These and other objects of the present invention will be apparent from the specification and examples which follow.

The above objects of the present invention are accomplished by spraying a foamable polyurethane coating composition onto a thermoplastic core whereby the surface of the core melts and then solidifies and fuses to the coating giving an exceptionally strong adhesive bond. Only certain foamable polyurethane compositions may be employed in the present invention. One requirement of these compositions is that they must generate sufficient heat of reactions to melt or soften the surface of the core thereby enabling a strong adhesive bond to develop between the polyurethane coating and the thermoplastic core. The use of the polyurethane compositions of the present invention allows for the preparation of laminated articles without the application of external heat. This provides a distinct advantage over prior art processes in that heat distortion of the thermoplastic core is substantially avoided.

The foamable polyurethane compositions which are employed in the present invention comprise:

a. a polyhydroxy-terminated alkylene oxide adduct of a compound selected from the group consisting of alkylene polyamines, polyalkylene polyamines, primary alkylamines, primary aralkylamines, primary cycloaliphatic amines, and ammonia;

b. an organic polyisocyanate in amounts such that the NCO/OH ratio of said polyurethane composition is between 0.7:1 to 1.5:1;

C. from 0.01% to 0.4% by weight of water based on the weight of said adduct; and d. from 0.05% to 5% by weight of a surfactant based on the weight of said adduct.

There are four essential components which comprise the foamable polyurethane composition employed in the present invention, namely, an organic polyisocyanate, certain nitrogen-containing polyols, water, and a surfactant. Illustrative organic polyisocyanates include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4-and 2,6-hexamethylene-1,6-diisocyanate, tetramethylene-1,4-diisocyanate, cyclohexane-1,4-diisocyanate, hexahydrotolylene-2,4- and 2,6-diisocyanates, naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-diphenylmethane-4,4'-diisocyanate; the triisocyanates such as 4,4',4''-triphenylmethane triisocyanate, polymethylene polyphenylisocyanate and tolylene 2,4,6-triisocyanate; and the tetraisocyanates such as 4,4'-dimethyl-diphenylmethane 2,2',5,5'-tetraisocyanate. Especially useful due to their availability and properties are tolylene diisocyanate, diphenylmethane-4,4'-diisocyanate, and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S Pat. No. 3,215,652. The amount of isocyanate employed will depend upon the molecular weight of the polyol sine an NCO/OH ratio of from 0.7:1 to 1.5:1, preferably 0.8:1 to 1.2:1, must be maintained.

The nitrogen-containing polyols which are employed in the preparation of the foamable polyurethane compositions may be defined as polyhydroxy-terminated alkylene oxide adducts of alkylene polyamines, polyalkylene polyamines, primary alkylamines, primary aralkylamines, primary cycloaliphatic amines, and ammonia. As used herein, the term "polyhydroxy" includes two or more hydroxyl groups. These adducts may be prepared by any known procedure such as by the reaction of alkylene oxides with selected amines or by the reaction of alkanol amines with organic compounds reactive with an amino hydrogen atom. Specifically, methyl diethanol amine may be prepared by the reaction of methyl amine with ethylene oxide or by the reaction of methyl chloride with diethanol amine. Regardless of their preparation, the compounds are referred to herein as alkylene oxide adducts. In the interest of brevity, only the preparation of the nitrogen-containing polyols by the reaction of alkylene oxides with certain amines will be more fully described. It is understood, however, as discussed above that these compounds may be prepared by other methods.

Illustrative alkylene oxides which may be employed in the preparation of the nitrogen-containing polyols include ethylene oxide, propylene oxide, butylene oxide, amylene oxide, dodecene oxide, epichlorohydrin, and epibromohydrin. Those alkylene oxides containing from two to four carbon atoms are preferred. Mixtures of any of the oxides may also be employed, thus resulting in heteric polyols. Also, two or more oxides may be reacted in sequence to produce block polyols.

As mentioned above, the nitrogen-containing polyols may be defined as adducts of alkylene polyamines, polyalkylene polyamines, primary alkylamines, primary aralkylamines, primary cycloaliphatic amines, and ammonia. Adducts of aromatic polyamines are not effectively employed in accordance with the present invention. Illustrative alkylene polyamines include ethylene diamine, propylene diamine, butylene diamine, propylene triamine, and hexamethylene diamine. Illustrative polyalkylene polyamines include diethylene triamine, triethylene tetramine, dipropylene triamine, and dipropylene tetramine. Illustrative primary alkylamines include methylamine, ethylamine, propylamine, butylamine, dodecylamine, and substituted alkylamines such as diethyl aminomethylphosphonate. Illustrative primary aralkylamines include benzylamine, xylylene diamine, and trisaminomethyl (2-hydroxypropoxy) benzene. Illustrative primary cycloaliphatic amines include cyclohexylamine, cyclopentylamine, hexahydro-toluene-2,4- and 2,6-diamine and mixtures thereof. It should be noted that aralkylamines are effectively employed in the present invention since they act and react as alkylamines rather than as arylamines. Mixtures of any of the above may also be employed.

It is possible to employ as the hydroxy-containing component of the polyurethane composition employed in the present invention a mixture of the nitrogen-containing polyols described above and some other organic compound containing at least two active hydrogen atoms providing that at least 25% by weight of the mixture is a nitrogen-containing polyol. Thus, polyester, polyalkylene polyether polyols, polythioethers, alkylene oxide adducts of acids of phosphorus, polyacetals, and aliphatic polyols and thiols, all well known in the art, may be employed along with the nitrogen-containing polyol as one component of the foamable polyurethane compositions.

Water is the third essential component of the foamable compositions employed in the present invention. Based on the weight of the polyol, from 0.01% to 0.4% by weight of water will be employed. The amount of water employed will include the amount of water present, if any, in the polyol.

A surfactant or wetting agent is the fourth essential component of the foamable compositions employed in the present invention. Numerous surfactants have been found satisfactory including those nonionic surface active agents prepared by the sequential addition of propylene oxide and ethylene oxide to propylene glycol and the solid or liquid water-soluble organosilicones. Other surface active agents which are operable include polyethylene glycol ethers of long chain alcohols, tertiary amine or alkylol amine salts of long chain alkyl acid sulfate esters, alkyl sulfonic esters, and alkyl aryl sulfonic acids. Generally, based on the weight of the polyol, from about 0.05% to 5% by weight of surfactant will be employed.

Any of the well known thermoplastic polymers may be employed in the preparation of the laminates of the present invention. Representative thermoplastic polymers include alkenyl aromatic resins such as polymers of styrene, α-methylstyrene, o-methylstyrene, m-methylstyrene, p-methylstyrene, aralkylstyrene, arvinylstyrene, halostyrene, arhalostyrene or copolymers of the above with each other or with minor amounts of polymerizable olefinic compounds such as acrylonitrile, methacrylate, methylmethacrylate and divinylbenzene. Other thermoplastic polymers which may be employed in the present invention include polyolefins such as polyethylene, polypropylene, polybutylene and copolymers thereof. Vinyl chloride polymers and copolymers are another type of thermoplastic polymer useful in the present invention.

A core material of any desired form or thickness may be used in the present invention depending upon the desired end product. The polyurethane foam coating may also vary in thickness. Generally, however, a coating thickness of from about 0.05 inch to about 0.5 inch will be employed.

The core material may be foamed or expanded by any known method depending on the particular plastic therein. In the case of thermoplastics this may be by extrusion of a mobile gel containing a blowing agent; foaming-in-place bead techniques, and so forth. The expanded core materials and the foamed polyurethane surface covering may, of course, contain pigments, fillers, self-extinguishing agents and the like, as may be desired or appropriate for the purposes at hand.

The laminates of the present invention are prepared by simply spraying the foamable polyurethane composition onto the thermoplastic core material at ambient temperatures. The following examples illustrate the invention. All parts are by weight unless stated otherwise. In the examples which follow, the physical properties recorded were determined in accordance with standard ASTM procedures. These procedures are:

| | |
|---|---|
| Tensile Strength | D-638 |
| % Elongation | D-638 |
| Hardness, Shore D | D-785 |
| K Factor | C-177 |
| Interlaminar Adhesion | D-1623 |
| Flexural Strength | D-790 |

EXAMPLE I

A slab of cellular polystyrene (six lbs/ft³ bead board) was sprayed with a foamable polyurethane composition resulting in a high density rigid polyurethane foam coating directly adherent to a thermoplastic polystyrene core. A coating of about 0.25 inch thick was applied to the core. The foamable polyurethane composition employed comprised 100 parts of a nitrogen-containing polyol having a hydroxyl number of 440 prepared by reacting a propylene oxide adduct of ethylene diamine with ethylene oxide, 111.7 parts of polymethylene polyphenylisocyanate, 0.10 part of water (including water in the polyol) and 0.25 part of a silicone surfactant. The polyurethane foam coating exhibited the following properties:

| | |
|---|---|
| Density–lbs./ft.³ | 40.0 |
| % Elongation | 6 |
| Tensile, p.s.i. | 2,811 |
| Hardness, Shore D | 61 |
| K Factor at 75° F. | 0.471 |

Additionally, a strong adhesive bond existed between the polyurethane foam coating and the polystyrene foam core. In fact, when the laminate was pulled apart, it was observed that the break occurred in the core, thus indicating that the adhesive strength of the coating to core is stronger than the cohesive strength of the core.

EXAMPLE II fact,

The high density polyurethane foam coating described in example I was sprayed onto a core of (a) polystyrene (six lbs./ft.³ bead board), (b) acrylonitrile-butadiene-styrene (ABS-Commonly known as Cycolac-L), and (C) polyvinylchloride. A low density foam of the following composition was also sprayed onto the same substrates:

| | Parts by Weight |
|---|---|
| Polyol described in example I | 40 |
| O,O-diethyl-N,N-bis(2-hydroxyethyl) aminomethylphosphonate | 10 |
| N,N,N',N'-tetrakis (2-hydroxpropyl) ethylene diamine | 40 |
| 850 molecular weight adduct of sucrose and propylene oxide | 10 |
| Silicone surfactant | 0.5 |
| Triethylene diamine | 0.7 |
| Dibutyltin dilaurate | 0.5 |
| Difluorochloromethane | 60 |
| Polymethylene polyphenylisocyanate | 110 |

The low density polyurethane foam coating exhibited the following properties:

| | |
|---|---|
| Density—lbs./ft.³ | 1.96 |
| Compressive Strength, p.s.i. | 28 |
| Tensile Strength, p.s.i. | 52 |
| K Factor at 75° F. | 0.119 |
| Flexural Strength, p.s.i. | 42 |

The foam-coated substrates were then subjected to an interlaminar adhesion test (ASTM D-1623) to determine the strength of the bond between the foam coating and the thermoplastic core. The results of this test are presented in Table I below. The test indicates that in all three cases where the high density foam of the present invention was employed as a coating the bond between the coating and the core was stronger than either the cohesive strength of the core or the epoxy adhesive. In all three cases when the low density foam was employed as a coating, the bond between the coating and the core was the weakest point of the laminate.

TABLE 1. INTERLAMINAR ADHESION

| Substrate | Low density foam | High density foam |
|---|---|---|
| Acrylonitrile-butadiene styrene (ABS) | 15.3 p.s.i.—failed at ABS—foam interface | 166 p.s.i.—epoxy failed. |
| Polyvinylchloride | 38.0 p.s.i.—failed at vinyl—foam interface | 161 p.s.i.—epoxy failed. |
| Polystyrene | 18 p.s.i.—failed at polystyrene foam interface | 60 p.s.i.—polystyrene failed. |

EXAMPLE III

The procedure of Example I was followed with the exception that the foamable composition comprises 0.3 part of water. The polyurethane foam coating exhibited the following properties:

| | |
|---|---|
| Density—lbs./ft.³ | 26.5 |
| % Elongation | 5 |
| Tensile, p.s.i. | 1,441 |
| Hardness, Shore D | 46 |
| K Factor at 75° F. | 0.407 |

Again, a strong adhesive bond was observed between the coating and the core.

EXAMPLE IV

The procedure of Example I was followed with the exception that the foamable composition comprised 50 parts of the polyol described in Example I and 50 parts of a polyol having a hydroxyl number of 400 prepared by the condensation of propylene oxide with phosphoric acid, 111.7 parts of polymethylene polyphenylisocyanatic, 0.25 part of silicone surfactant, 0.025 part of water, and 0.3 part of triethylenediamine. The polyurethane foam coating exhibited the following properties:

| | |
|---|---|
| Density—lbs./ft.³ | 34 |
| % Elongation | 9.2 |
| Tensile, p.s.i. | 1,945 |
| Hardness, Shore D | 54 |

The resulting laminate exhibited an exceptionally strong adhesive bond between the foam and the core.

EXAMPLE V

Laminated articles particularly useful in the preparation of building panels are prepared by spraying foamable polyurethane compositions onto polystyrene boards. A polyurethane coating of about 0.25 inch thick is applied to the boards. The coating compositions are similar to that described in example I differing in the nitrogen-containing polyol. The nitrogen-containing polyols employed are as follows:

a. the four mole propylene oxide adduct of N,N,N',N'-tetrakis (2-hydroxypropyl) ethylene diamine;
b. the five mole propylene oxide adduct of diethylene triamine;
c. the four mole ethylene oxide adduct of xylylene diamine;
d. the six mole ethylene oxide adduct of 2,4,6-trisaminomethyl-1-(2-hydroxypropoxy) benzene which may also be prepared by the reaction of phenol, formaldehyde, diethanolamine and propylene oxide;
e. the polyol prepared by reacting one mole of phenol, formaldehyde and diethanol amine with three moles of propylene oxide.

Building panels having excellent adhesive bonds between the polyurethane foam coating and the thermoplastic core are obtained.

What is claimed is:

1. A laminated article comprising a thermoplastic core and a high density rigid polyurethane foam coating directly adherent thereto, said polyurethane foam coating prepared by the reaction of:

a. a polyhydroxy-terminated alkylene oxide adduct of a compound selected from the group consisting of alkylene polyamines, polyalkylene polyamines, primary alkylamines, primary aralkylamines, primary cycloaliphatic amines, and ammonia;
 b. an organic polyisocyanate in amounts such that the NCO/OH ratio of said polyurethane composition is between 0.7:1 to 1.5:1;
 c. from 0.01% to 0.4% by weight of water based on the weight of said adduct; and
 d. from 0.05% to 5% by weight of a surfactant based on the weight of said adduct.

2. The article of claim 1 wherein (a) is an alkylene oxide adduct of an alkylene polyamine.

3. The article of claim 1 wherein (a) is an alkylene oxide adduct of ethylene diamine.

4. The article of claim 1 wherein (a) is an alkylene oxide adduct of diethylene triamine.

5. The article of claim 1 wherein the polyurethane foam is prepared from (1) a mixture of an alkylene oxide adduct of a compound selected from the group consisting of alkylene polyamines, polyalkylene polyamines, primary alkylamines, primary aralkylamines, primary cycloaliphatic amines, and ammonia, and (2) a compound selected from the group consisting of polyesters, polyalkylene polyether polyols, polythioethers, alkylene oxide adducts of acids of phosphorus, polyacetals, aliphatic polyols and aliphatic thiols, said mixture comprising at least 25% by weight of the total mixture of said alkylene oxide adduct.

6. The article of claim 1 wherein the thermoplastic core is polystyrene.

7. In a method of preparing a laminated article by spraying a foamable polyurethane composition onto a thermoplastic core, the improvement which comprises employing as the foamable polyurethane composition:

a. a polyhydroxy-terminated alkylene oxide adduct of a compound selected from the group consisting of alkylene polyamines, polyalkylene polyamines, primary alkylamines, primary aralkylamines, primary cycloaliphatic amines, and ammonia;
 b. an organic polyisocyanate in amounts such that the NCO/OH ratio of said polyurethane composition is between 0.7:1 to 1.5:1;
 c. from 0.01% to 0.4% by weight of water based on the weight of said adduct; and
 d. from 0.05% to 5% by weight of a surfactant based on the weight of said adduct.

* * * * *